United States Patent
Lohia et al.

(10) Patent No.: US 11,455,554 B2
(45) Date of Patent: Sep. 27, 2022

(54) TRUSTWORTHINESS OF ARTIFICIAL INTELLIGENCE MODELS IN PRESENCE OF ANOMALOUS DATA

(71) Applicant: International Business Machines Corporation, Armonk, NY (US)

(72) Inventors: Pranay Kumar Lohia, Bhagalpur (IN); Diptikalyan Saha, Bangalore (IN); Aniya Aggarwal, New Delhi (IN); Gagandeep Singh, Bangalore (IN); Rema Ananthanarayanan, New Delhi (IN); Samiulla Zakir Hussain Shaikh, Bangalore (IN); Sandeep Hans, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 16/694,484

(22) Filed: Nov. 25, 2019

(65) Prior Publication Data

US 2021/0158183 A1    May 27, 2021

(51) Int. Cl.
*G06N 5/04* (2006.01)
*G06N 20/00* (2019.01)
*G06N 20/20* (2019.01)

(52) U.S. Cl.
CPC .............. *G06N 5/04* (2013.01); *G06N 20/00* (2019.01); *G06N 20/20* (2019.01)

(58) Field of Classification Search
CPC ........... G06N 5/04; G06N 20/00; G06N 20/20
See application file for complete search history.

(56) References Cited

U.S. PATENT DOCUMENTS

| | | |
|---|---|---|
| 7,370,357 B2 | 5/2008 | Sekar |
| 7,739,211 B2 | 6/2010 | Coffman |
| 8,887,286 B2 | 11/2014 | Dupont et al. |
| 9,483,049 B2 | 11/2016 | Maeda et al. |
| 9,716,723 B2 | 7/2017 | Wittenschlaeger |

(Continued)

OTHER PUBLICATIONS

Cho, Sung-Bae, and Hyuk-Jang Park. "Efficient anomaly detection by modeling privilege flows using hidden Markov model." computers & security 22.1 (2003): 45-55.

(Continued)

*Primary Examiner* — Shirley X Zhang
(74) *Attorney, Agent, or Firm* — Ryan, Mason & Lewis, LLP (57) ABSTRACT

Methods, systems, and computer program products for improving trustworthiness of artificial intelligence models in presence of anomalous data are provided herein. A method includes obtaining a machine learning model and a set of training data; determining one or more anomalous data points in said set of training data; for a given one of said anomalous data points, identifying attributes that decrease confidence with respect to at least one output of said machine learning model; determining that a root cause of said decreased confidence corresponds to one of: a class imbalance issue related to said at least one attribute, a confused class issue related to said at least one attribute, a low density issue related to said at least one attribute, and an adversarial issue related to said at least one attribute; and performing step(s) to improve said confidence based at least in part on said determined root cause.

20 Claims, 6 Drawing Sheets

(56) References Cited

U.S. PATENT DOCUMENTS

| | | | |
|---|---|---|---|
| 10,706,323 B1* | 7/2020 | Liebman | G06N 20/00 |
| 10,719,301 B1* | 7/2020 | Dasgupta | G06F 11/3688 |
| 2017/0063898 A1 | 3/2017 | Muddu et al. | |
| 2017/0372229 A1* | 12/2017 | Ura | G06N 20/00 |
| 2018/0082193 A1 | 3/2018 | Cormier et al. | |
| 2018/0082207 A1 | 3/2018 | Cormier et al. | |
| 2020/0265341 A1* | 8/2020 | Bhatt | G06N 20/00 |
| 2020/0387836 A1* | 12/2020 | Nasr-Azadani | G06N 20/20 |

OTHER PUBLICATIONS

Liu, Ninghao, Donghwa Shin, and Xia Hu. "Contextual outlier interpretation." arXiv preprint arXiv:1711.10589 (2017).

Shalev, Gabi, Yossi Adi, and Joseph Keshet. "Out-of-distribution detection using multiple semantic label representations." Advances in Neural Information Processing Systems. 2018.

McFowland, Edward, Skyler Speakman, and Daniel B. Neill. "Fast generalized subset scan for anomalous pattern detection." The Journal of Machine Learning Research 14.1 (2013): 1533-1561.

Valdes, Alfonso, and Keith Skinner. "Adaptive, model-based monitoring for cyber attack detection." International Workshop on Recent Advances in Intrusion Detection. Springer, Berlin, Heidelberg, 2000.

Ribeiro, Marco Tulio, et al. "Why should i trust you?: Explaining the predictions of any classifier." In Proceedings of the 22nd ACM SIGKDD international conference on knowledge discovery and data mining, pp. 1135-1144. ACM, 2016.

Liu, Fei Tony, Kai Ming Ting, and Zhi-Hua Zhou. "Isolation-based anomaly detection." ACM Transactions on Knowledge Discovery from Data (TKDD) 6.1 (2012): 3.

Cheung, Steven, et al. "Using model-based intrusion detection for SCADA networks." Proceedings of the SCADA security scientific symposium. vol. 46. 2007.

* cited by examiner

FIG. 1

```
{
    "col_name": "score",
    "row: {"Name": "John", "Age": 32, "score": 375 ....}
    row_id: 3248
    explanation: {
        "val": 375,
        "sd": 13.2,
        "mean": 74.5,
        "Constraint_Type": "Numeric",
        "Description": "The value lies far away from the expected region defined by the mean and the standard deviation of the observed values,
        "Anomaly Type": "Numeric - Out of distribution"
    }
}
```

TRUSTWORTHINESS OF ARTIFICIAL INTELLIGENCE MODELS IN PRESENCE OF ANOMALOUS DATA

BACKGROUND

The present application generally relates to information technology and, more particularly, to trustworthiness of artificial intelligence models.

In general, machine learning refers to the process of training a model (i.e., a piece of software) using a data set so that the model can make useful predictions. The trained model may then output predictions when provided input corresponding to previously unseen data. When problems exist in the data set that is used to train the model (for example, out of distribution data, anomalies, etc.), then the predictions from the model may not be useful.

SUMMARY

In one embodiment of the present invention, techniques for improving trustworthiness of artificial intelligence models in the presence of anomalous data are provided. An exemplary computer-implemented method includes the steps of obtaining (i) a machine learning model and (ii) a set of data points used for training said machine learning model; determining one or more anomalous data points in said set of data points; for a given one of said anomalous data points, identifying at least one attribute of said given anomalous data point that decreases confidence with respect to at least one output of said machine learning model; determining that a root cause of said decreased confidence corresponds to one of: a class imbalance issue related to said at least one attribute, a confused class issue related to said at least one attribute, a low density issue related to said at least one attribute, and an adversarial issue related to said at least one attribute; and performing one or more steps to improve the confidence of said machine learning model based at least in part on said determined root cause.

Another exemplary computer-implemented method includes obtaining (i) a machine learning model, (ii) a set of training data used to train said machine learning model, and (iii) at least one data point in said set of training data identified as an anomaly; determining a root cause of behavior of said machine learning model that caused said at least one data point to be an anomaly, wherein determining said root cause comprises one or more of: (i) determining a class imbalance in said set of training data; (ii) identifying that said at least one data point is an adversarial data point; (iii) identifying that said at least one data point is a confused class data point; and (iv) identifying that said at least one data point corresponds to a low density region in said set of training data; adjusting said set of training data, based on said root cause, by at least one of: (i) relabeling at least a portion of said training data and (ii) adding additional training data to said set of training data; and re-training said machine learning model based on the adjusted set of training data to remove the behavior caused by said at least one anomaly.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The trustworthiness of an artificial intelligence or machine learning (ML) model may be impacted by factors corresponding to the training data set such as, for example, anomalous data and out of distribution data. For example, a prediction output by the model on anomalous data points cannot be trusted if the attributes (i.e., input variables used by the model to make predictions) are the same as the attributes involved in the anomaly.

The exemplary embodiments herein describe techniques for identifying trustworthiness of artificial intelligence models in the presence of anomalous data, and recommending and/or implementing steps to improve the model trustworthiness. These techniques may include generating insights into the trustworthiness of the ML model, generating guards against data drift, and/or generating augmented training data for retraining the model. As such, exemplary embodiments allow data samples to no longer be classified as anomalies, thereby increasing the trustworthiness of the ML model.

One or more of the exemplary embodiments utilize techniques for explaining predictions of any machine learning models such as, for example, Local Interpretable Model-Agnostic Explanations (LIME). In general, these techniques attempt to understand the model by perturbing the input of data samples and understanding how the predictions change. For example, a LIME approach modifies a single data sample by adjusting the feature values and observing the resulting impact on the output (see, for example, Ribeiro et al., *"Why should I trust you?" Explaining the Predictions of Any Classifier*, Proceedings of the 22nd ACM SIGKDD International Conference on Knowledge Discovery and Data Mining. ACM (2016), which is hereby incorporated by reference in its entirety).

Figure 1:
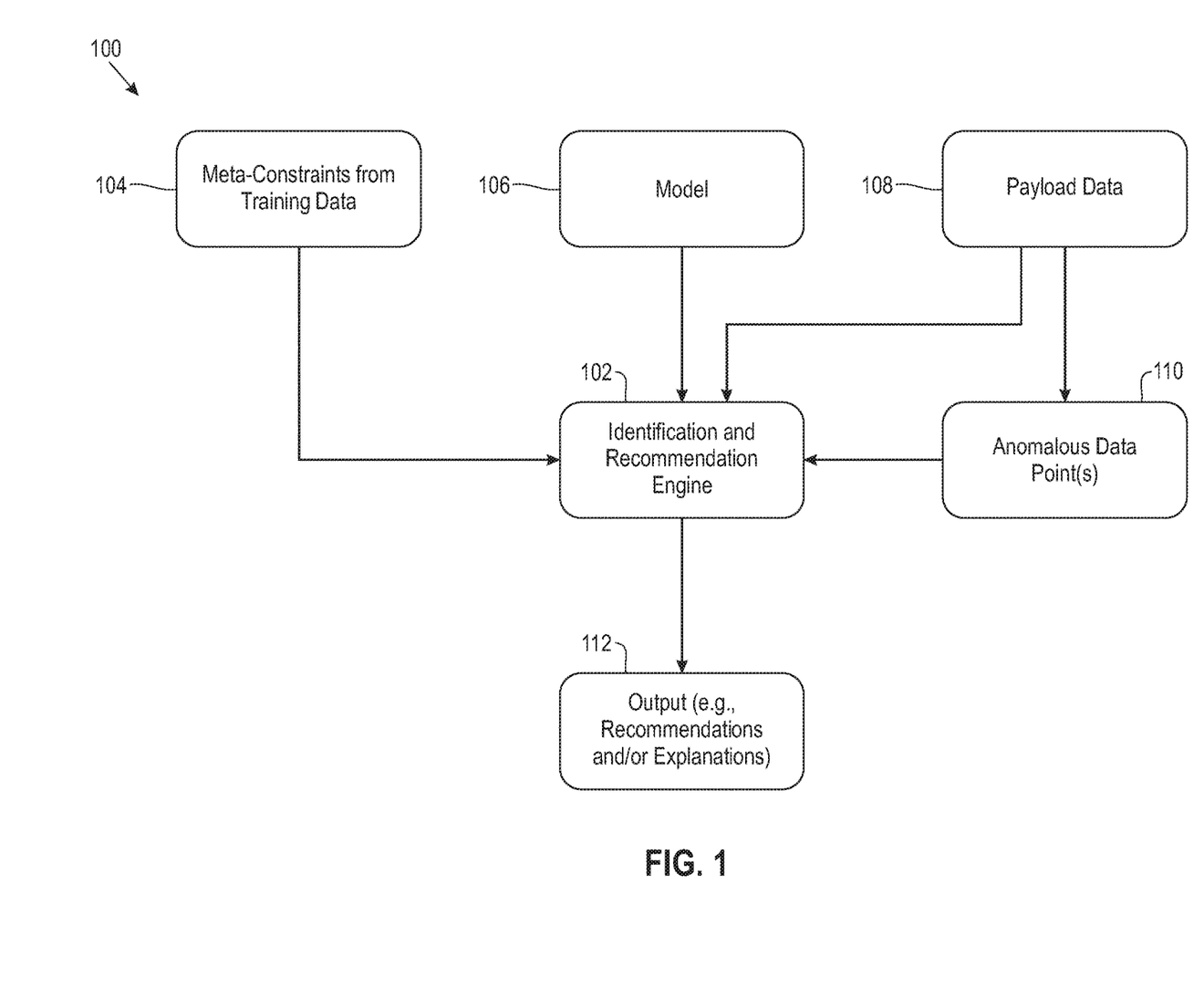
FIG. 1 is a diagram illustrating a system architecture, according to an exemplary embodiment of the invention.

FIG. 1 is a diagram illustrating a system architecture 100, according to an exemplary embodiment of the invention. The system architecture 100 includes an identification and recommendation engine 102 that obtains the following inputs: (i) meta-constraints from training data 104; (ii) a model 106; (iii) payload data 108; and anomalous data point(s) 110. The anomalous data points 110 may correspond to out-of-distribution data points of the payload data 108, for example.

The identification and recommendation engine 102 identifies, for example, how class prediction of the model 106 is linked (indirectly or directly) to anomalous behavior based on the various inputs. The identification may include identifying a root cause of the anomalous behavior based on various different processes as explained in more detail herein. For example, the root cause of the anomalous behavior may correspond to at least one of the following categories: adversarial samples, class imbalance samples, confused class samples, and low density samples.

The identification and recommendation engine 102 then generates output 112, which includes, for example, one or more recommendations to improve the trustworthiness of the model 106. For example, the output 112 may include a set of steps to perform to remove the anomalous behavior and/or explanations (e.g., human readable explanations) explaining the anomalous model behavior. In at least one example, the identification and recommendation engine 102 automatically (i.e., without any further user input) performs the recommended steps included in the output 112.

According to an exemplary embodiment, a process (performed, for example, by the identification and recommendation engine 102) includes:

1. Obtaining input including a model, one or more anomalous data points, and results (e.g., in a format shown in FIG. 2) corresponding to the anomalous data points.
2. For each anomalous data point, identifying the contributing attributes based on the model and LIME.
3. Performing small perturbations of the contributing attributes to generate additional data points.
4. Labeling the additional data points (i.e., the perturbed data points) and relabeling at least a portion of the original anomalous data points to generate new training data.
5. Re-training the model using the new training data.

The re-trained model from the process above results in a reduction of the original number of anomalous data points. Additionally, at least some of the data points that were originally identified as being anomalies are no longer identified as such.

Figure 2:
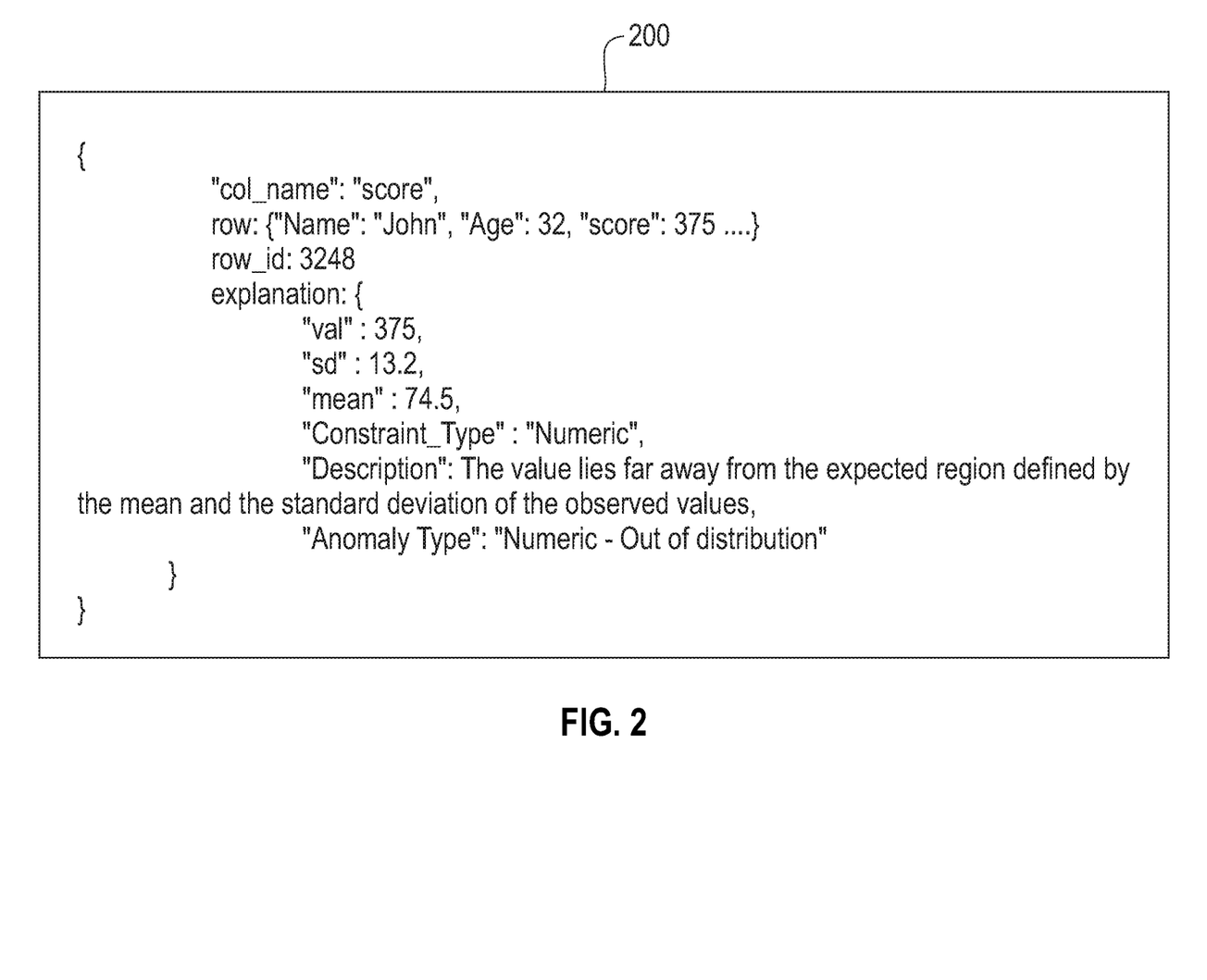
FIG. 2 is a diagram illustrating an anomaly data point format, according to an exemplary embodiment of the invention.

FIG. 2 shows a non-limiting example of an anomalous data point in an output format 200 in accordance with exemplary embodiments. In the example shown in FIG. 2, the output format 200 includes variables related to the anomalous data point, which include: the column name (i.e., col_name), a row, a row identifier (i.e., row_id), and an explanation. The explanation includes the following information for the anomalous data point: a value, a standard deviation (i.e., sd), a mean, a constraint type (i.e., constraint_type); a description indicating why the data point was identified as being an anomaly, and an anomaly type. In the example depicted in FIG. 2, the anomalous data point corresponds to a numeric value and the anomaly type is 'numeric—out of distribution'; however, it is to be appreciated that the format 200 can be used for other data types and/or other types of anomalies. For example, other types of anomalies include, but are not limited to, anomalies between a string value and an integer value (e.g., job and age); a binary value and an integer value (e.g., marital status and age); and between two strings (e.g., education and job).

Adversarial Samples

An algorithm for analyzing adversarial samples in accordance with exemplary embodiments includes the following steps:

1. Obtaining an ML model, payload data, anomaly results from the payload data, and training data constraints.
2. Performing perturbation to the data points while adhering to the training data constraint (e.g., a source to target relation).
3. Selecting the top K most frequent targets (e.g., K may be a predefined configuration parameter which user can select based on the application).
4. Creating K new perturbed data points.
5. Predicting labels of the new perturbed data points using the ML model.
6. If at least one of label changes, then considering the anomalous data point as an adversarial sample.
7. Outputting set of anomalous data points that were identified as adversary points.

The steps recommended (e.g., to be included in the output 112 of the identification and recommendation engine 102) to remove adversarial may include, for example, a step to reconsider the labeling of the identified adversarial samples, a step to add additional training data, and a step to re-train the model.

Class Imbalance Analysis and Recommendation

An exemplary process for analyzing a class imbalance anomaly includes:

1. Obtaining an ML model, payload data, anomaly results for the payload data, and training data constraints.
2. Identifying all combinations of classes (taken 2 at a time) and their respective frequencies based on the training constraints.
3. Identifying if a ratio of the frequency of one or more classes is less than a threshold value K (e.g., 20%).
4. Marking classes identified with lower frequencies as deficit classes, and marking classes with higher frequencies (e.g., classes exceeding K) as excess classes.
5. Identifying data points falling in class excess bucket within the anomalous data.
6. Checking whether the identified data points satisfy the constraints of class deficit label.
7. If satisfied, marking this label as a class imbalance point.
8. Outputting anomalous data points having class imbalance points.

According to at least one exemplary embodiment, a recommendation for removing class imbalance points includes recommending one or more of a step to perform under-sampling of data points associated with an excess class and a step to perform over sampling of data points associated with a deficit class. According to another exemplary embodiment, a recommendation may include a step to reconsider the labeling of the deficit class as the data points are near the boundary.

Confused Class Analysis and Recommendation

An example of a process for analyzing confused class anomalies includes the following steps:

1. Obtaining machine learning model, payload data, anomaly results from the payload data, and training data constraints.
2. For a given anomalous data point, identifying whether the model prediction confidence of two of the highest classes for that data point are substantially the same. For example, the confidence of the two highest classes for the data point may be within a predetermined range (e.g., 0 to 0.1). This range may also be selected by a user depending on the application.
3. If so, then identifying the given data point for the two classes as a confused class point.
4. Identifying one or more low confidence points in the neighborhood of that confused class point by perturbing the given data point using constraint of the two classes.
5. Applying LIME to identify the top contributing features.
6. Perturbing the top t/2 features using constraints of each of the two classes, wherein t is a predetermined threshold value corresponding to the number of neighbors for manual labeling.
7. Determining a set of data points comprising the total t-neighbor data points and the original confused class point.
8. Performing the steps above for all confused class data points.
9. Outputting set of anomalous data points having class imbalance points.

According to at least one exemplary embodiment, a recommendation for removing confused class data points includes recommending one or more of: a step of reconsidering all the confused class data points and their neighbors for re-labeling, a step of augmenting the training data, and a step of re-training the model

Low Density Analysis and Recommendation

Two algorithms for analyzing low density anomalies are described below that use different methods of clustering. The first algorithm uses a bottom-to-top approach of clustering, whereas the second algorithm is a naive top-to-bottom approach.

A first algorithm for analyzing low density anomalies in accordance with exemplary embodiments includes the following steps:

1. Obtaining a machine learning model, payload data, anomaly results for the payload data, and training data constraints.
2. For the constraint file: identifying a k-neighbors connectivity graph from the training data.
3. Applying the connectivity graph to perform hierarchical clustering (such as Agglomerative Clustering, which is a bottom to top approach to cluster based on density regions).
4. Calculating the number of clusters based on an empirical number (e.g., 4) * (no. of unique values in the class label column).
5. Identifying representative points (centroid) of low density regions (i.e., regions whose data points count is less than, e.g., 1% of the data).
6. For each anomalous data point, identifying to which cluster (from the constraint file) it belongs.
7. If the identified cluster is a low density region, identifying the anomalous data point as a low density point.
8. Identifying one or more additional low density points in the neighborhood of the identified low density point by perturbing the data point using a constraint associated with its class label.
9. Applying LIME to identify the top contributing features.
10. Perturbing the top t features using constraints of the class label of the data point, wherein t is a predetermined threshold value corresponding to the number of neighbors for manual labeling.
11. After perturbation, obtaining total t neighbor data points and the original low density point.
12. Performing the above-process for all low density based data points.
13. Outputting a set of low density data points and the neighbors of the respective low density data points.

A second algorithm for analyzing low density anomalies in accordance with exemplary embodiments includes the following steps:

1. Obtaining an ML model, payload data, anomaly results of the payload data, and training data constraints.
2. For the training constraints: performing clustering of the training data, and identifying representative points (centroids) to determine whether a data point lies in that cluster or not.
3. For each anomalous data point, identifying to which cluster (from the constraint file) it belongs.
4. If the cluster is a low density cluster, identifying that as a low density point.
5. Identifying one or more additional low density points in the neighborhood of the low density point by perturbing the data point using a constraint associated with its class label.
6. Applying LIME to identify the top contributing features.
7. Perturbing the top t features using constraints of the class label of the data point, wherein t is a predetermined threshold value corresponding to the number of neighbors for manual labeling.
8. After perturbation, obtaining total t neighbor data points and the original low density point.
9. Performing the process above for all low density data points.

It is noted that in the second algorithm, a low density cluster corresponds to a cluster where the number of data points associated with the cluster is one or more of: (i) much less than a threshold value and (ii) much less relative to the number of data point in other clusters).

A recommendation for removing low density data points may include, for example, recommending one or more of: a step to reconsider all low density based anomalous data points and their neighbors for re-labeling, and a step to augment the training data, and a step of re-training the model.

Figure 3:
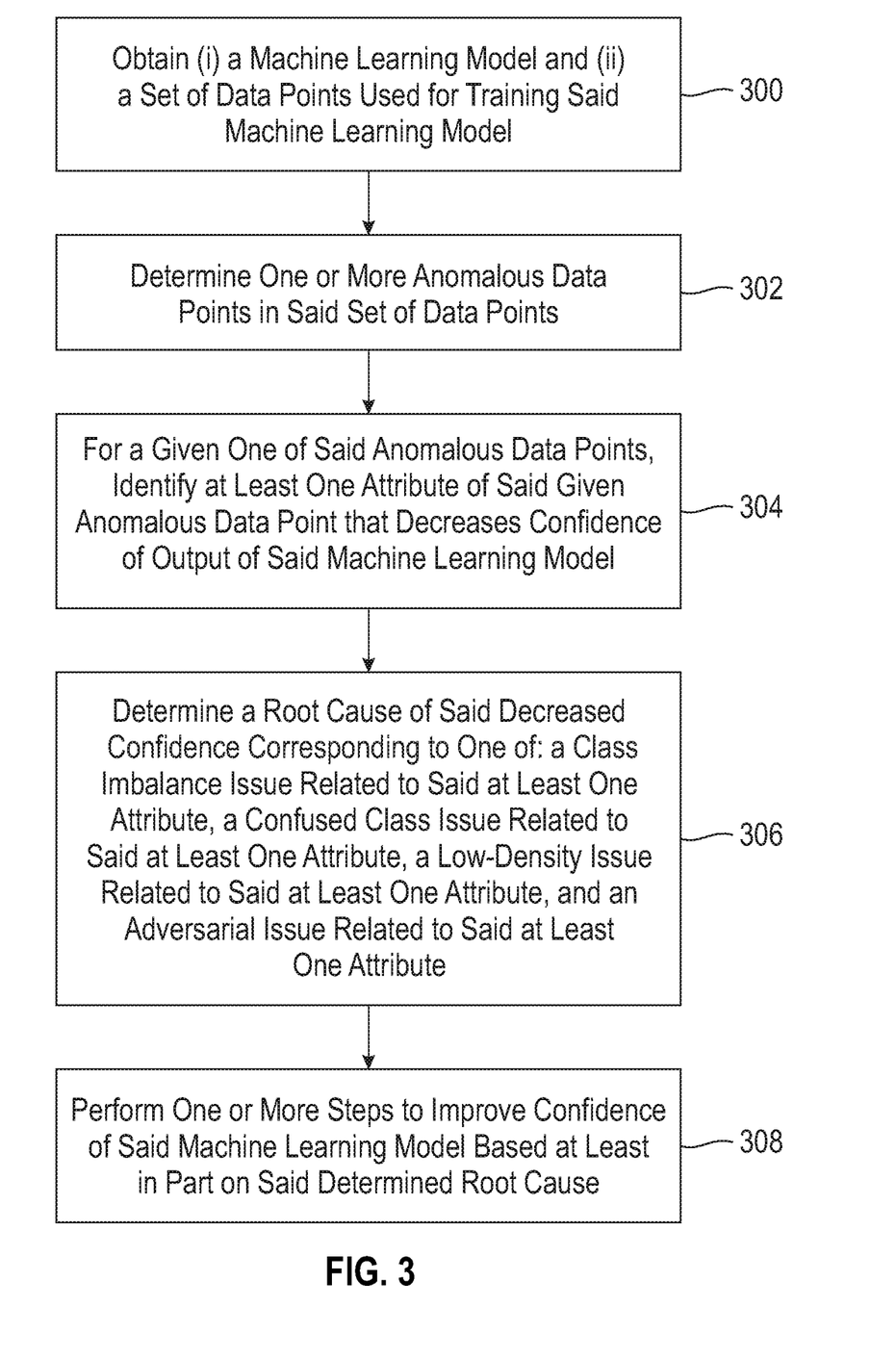
FIG. 3 is a flow diagram illustrating techniques according to an embodiment of the invention.

FIG. 3 is a flow diagram illustrating a process according to an embodiment of the present invention. Step 300 includes obtaining (i) a machine learning model and (ii) a set of data points used for training said machine learning model. Step 302 includes determining one or more anomalous data points in said set of data points. Step 304 includes for a given one of said anomalous data points, identifying at least one attribute of said given anomalous data point that decreases confidence with respect to at least one output of said machine learning model. Step 306 includes determining that a root cause of said decreased confidence corresponds to one of: a class imbalance issue related to said at least one attribute, a confused class issue related to said at least one attribute, a low density issue related to said at least one attribute, and an adversarial issue related to said at least one attribute. Step 308 includes performing one or more steps to improve the confidence of said machine learning model based at least in part on said determined root cause.

The process depicted in FIG. 3 may include perturbing the given anomalous data point to generate one or more additional data points. The at least one attribute may include two or more attributes, and the perturbing may include perturbing combinations of said two or more attributes. The process may include assigning training labels to said one or more additional data points. The one or more steps may include at least one of: re-evaluating training labels of said set of training data points; augmenting said set of data points with one or more additional data points; and re-training said machine learning model based at least in part on said re-evaluating and said one or more additional data points. In response to determining the root cause corresponds to a class imbalance issue, the one or more steps may include at least one of: (i) over-sampling of data points in said set of data points belonging to a class with fewer data points relative to other classes; and (ii) under-sampling of data points in said set of data points belonging to a class having a relatively greater number of data points relative to other classes. Determining the said root cause may include applying Local Interpretable Model-Agnostic Explanations to identify said at least one attribute of said given anomalous data point. The process may include generating a human readable explanation explaining said decreased confidence value; and outputting said human readable explanation to a user.

According to another exemplary embodiment, a method includes obtaining (i) a machine learning model, (ii) a set of training data used to train said machine learning model, and (iii) at least one data point in said set of training data identified as an anomaly; determining a root cause of behavior of said machine learning model that caused said at least one data point to be an anomaly, wherein determining said root cause comprises one or more of: (i) determining a class imbalance in said set of training data; (ii) identifying that said at least one data point is an adversarial data point; (iii) identifying that said at least one data point is a confused class data point; and (iv) identifying that said at least one data point corresponds to a low density region in said set of training data; adjusting said set of training data, based on said root cause, by at least one of: (i) relabeling at least a portion of said training data and (ii) adding additional training data to said set of training data; and re-training said machine learning model based on the adjusted set of training data to remove the behavior caused by said at least one anomaly.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
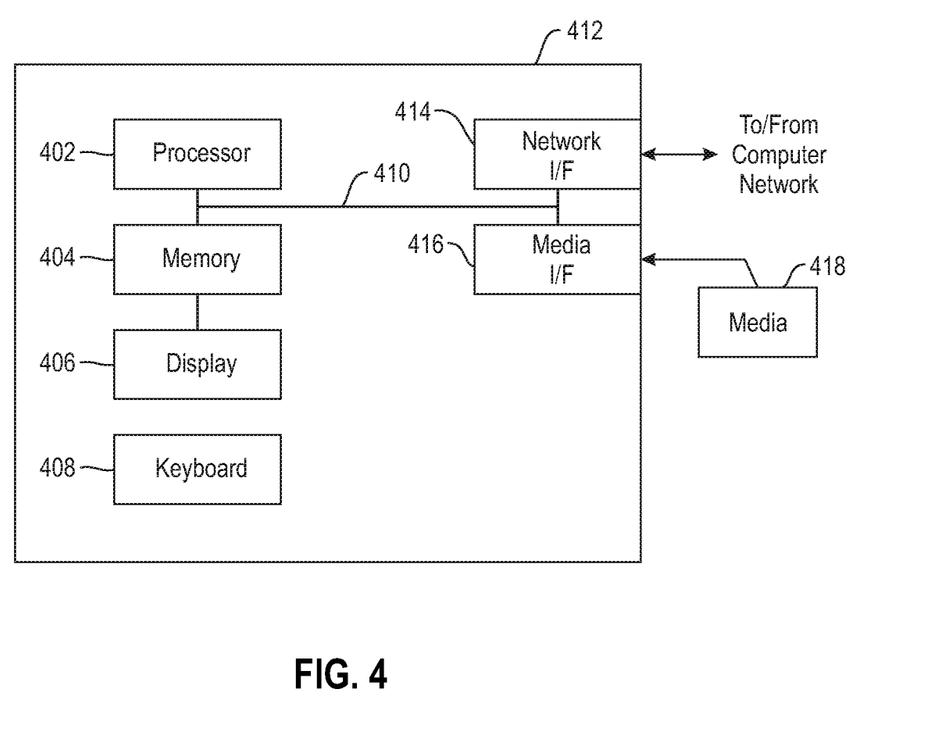
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like)

can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
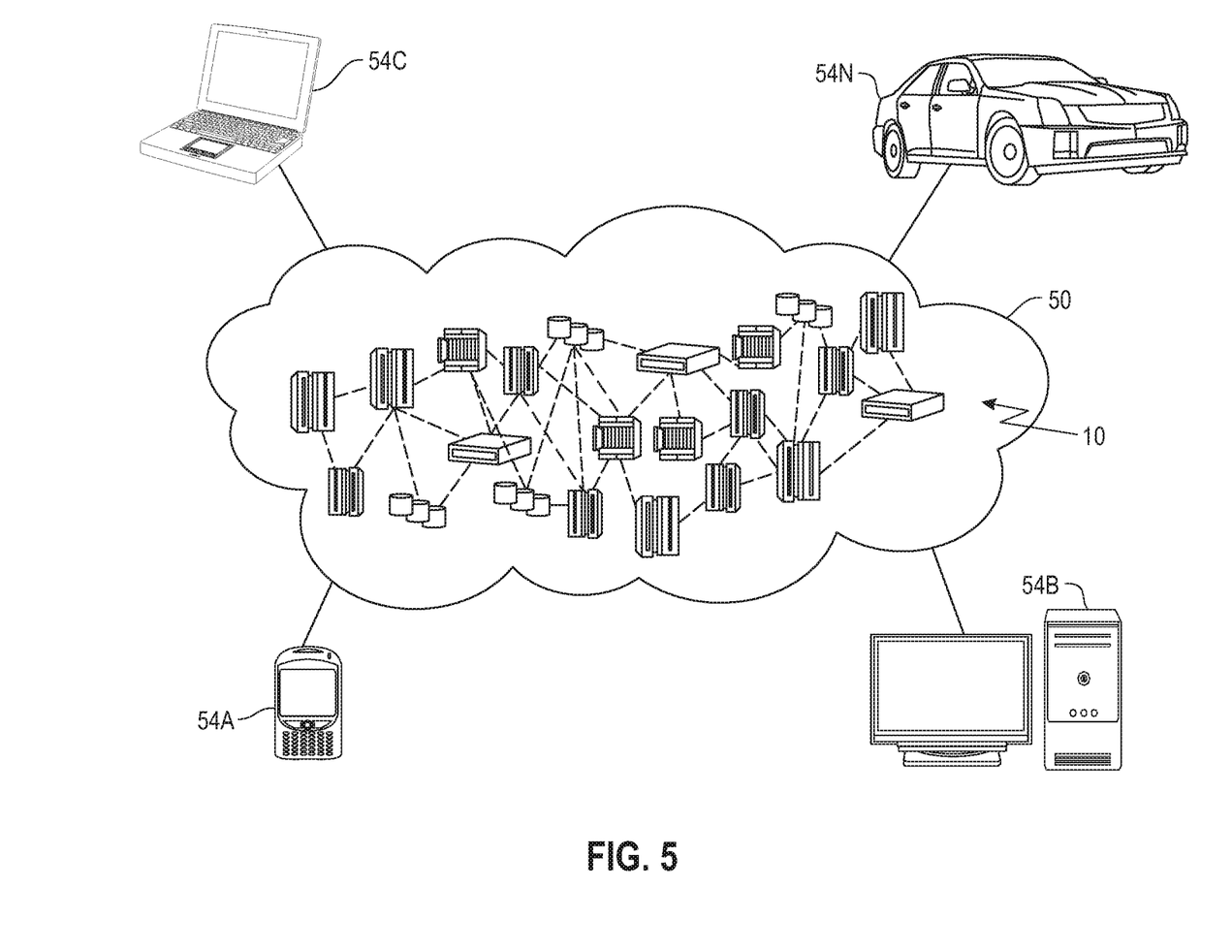
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
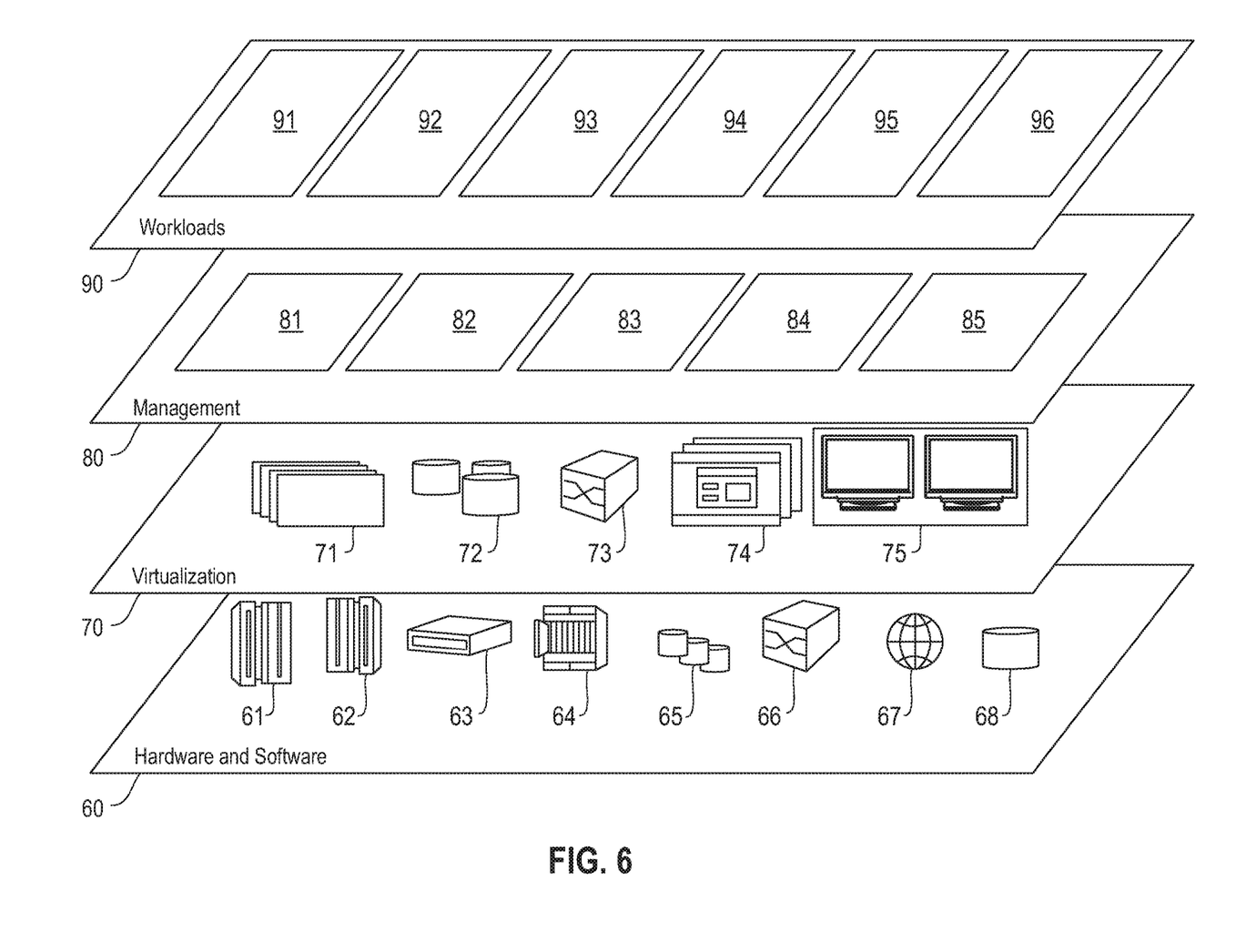
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying an improving model trustworthiness in presence of anomalous data 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

Exemplary embodiments of the present invention may provide one or more beneficial effects such as, for example, improving the trustworthiness of machine learning models in the presence of anomalous data, augmenting training data to remove anomalies, and automatically generating insights to model behavior.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
  obtaining (i) a trained machine learning model and (ii) a set of data points used to train said machine learning model;
  determining one or more anomalous data points in said set of data points;
  for a given one of said anomalous data points, identifying at least one attribute of said given anomalous data point that decreases confidence with respect to at least one output of said machine learning model;
  determining that a root cause of said decreased confidence corresponds to one of: a class imbalance issue related to said at least one attribute, a confused class issue related to said at least one attribute, a low density issue related to said at least one attribute, and an adversarial issue related to said at least one attribute; and
  performing one or more steps to improve said confidence of said machine learning model based at least in part on said determined root cause;
  wherein the method is carried out by at least one computing device.

2. The computer-implemented method of claim 1, comprising:
  perturbing the given anomalous data point to generate one or more additional data points.

3. The computer-implemented method of claim 2, wherein said at least one attribute comprises two or more attributes, and wherein said perturbing comprises perturbing combinations of said two or more attributes.

4. The computer-implemented method of claim 2, comprising:
   assigning training labels to said one or more additional data points.

5. The computer-implemented method of claim 1, wherein said one or more steps comprise at least one of:
   re-evaluating training labels of said set of training data points;
   augmenting said set of data points with one or more additional data points; and
   re-training said machine learning model based at least in part on said re-evaluating and said one or more additional data points.

6. The computer-implemented method of claim 1, wherein, in response to determining said root cause corresponds to a class imbalance issue, the one or more steps comprise at least one of: (i) over-sampling of data points in said set of data points belonging to a class with fewer data points relative to other classes; and (ii) under-sampling of data points in said set of data points belonging to a class having a relatively greater number of data points relative to other classes.

7. The computer-implemented method of claim 1, wherein said determining said root cause comprises applying Local Interpretable Model-Agnostic Explanations to identify said at least one attribute of said given anomalous data point.

8. The computer-implemented method of claim 1, comprising:
   generating a human readable explanation explaining said decreased confidence value; and
   outputting said human readable explanation to a user.

9. A computer program product comprising a computer readable storage medium having program instructions embodied therewith, the program instructions executable by a computing device to cause the computing device to:
   obtain (i) a trained machine learning model and (ii) a set of data points used to train said machine learning model;
   determine one or more anomalous data points in said set of data points;
   for a given one of said anomalous data points, identify at least one attribute of said given anomalous data point that decreases confidence with respect to at least one output of said machine learning model;
   determine that a root cause of said decreased confidence corresponds to one of: a class imbalance issue related to said at least one attribute, a confused class issue related to said at least one attribute, a low density issue related to said at least one attribute, and an adversarial issue related to said at least one attribute; and
   perform one or more steps to improve said confidence of said machine learning model based at least in part on said determined root cause.

10. The computer program product of claim 9, wherein the program instructions executable by a computing device further cause the computing device to:
    perturb the given anomalous data point to generate one or more additional data points.

11. The computer program product of claim 10, wherein said at least one attribute comprises two or more attributes, and wherein said perturbing comprises perturbing combinations of said two or more attributes.

12. The computer program product of claim 10, wherein the program instructions executable by a computing device further cause the computing device to:
    assign training labels to said one or more additional data points.

13. The computer program product of claim 9, wherein said one or more steps comprise at least one of:
    re-evaluating training labels of said set of training data points;
    augmenting said set of data points with one or more additional data points; and
    re-training said machine learning model based at least in part on said re-evaluating and said one or more additional data points.

14. The computer program product of claim 9, wherein, in response to determining said root cause corresponds to a class imbalance issue, the one or more steps comprise at least one of: (i) over-sampling of data points in said set of data points belonging to a class with fewer data points relative to other classes; and (ii) under-sampling of data points in said set of data points belonging to a class having a relatively greater number of data points relative to other classes.

15. The computer program product of claim 9, wherein said determining said root cause comprises applying Local Interpretable Model-Agnostic Explanations to identify said at least one attribute of said given anomalous data point.

16. The computer program product of claim 9, wherein the program instructions executable by a computing device further cause the computing device to:
    generate a human readable explanation explaining said decreased confidence value; and
    output said human readable explanation to a user.

17. A system comprising:
    a memory; and
    at least one processor operably coupled to the memory and configured for:
      obtaining (i) a trained machine learning model and (ii) a set of data points used to train said machine learning model;
      determining one or more anomalous data points in said set of data points;
      for a given one of said anomalous data points, identifying at least one attribute of said given anomalous data point that decreases confidence with respect to at least one output of said machine learning model;
      determining that a root cause of said decreased confidence corresponds to one of: a class imbalance issue related to said at least one attribute, a confused class issue related to said at least one attribute, a low density issue related to said at least one attribute, and an adversarial issue related to said at least one attribute; and
      performing one or more steps to improve said confidence of said machine learning model based at least in part on said determined root cause.

18. The system of claim 17, wherein the at least one processor is configured for:
    perturbing the given anomalous data point to generate one or more additional data points.

19. The system of claim 18, wherein said at least one attribute comprises two or more attributes, and wherein said perturbing comprises perturbing combinations of said two or more attributes.

20. A computer-implemented method, the method comprising:
    obtaining (i) a machine learning model, (ii) a set of training data used to train said machine learning model, and (iii) at least one data point in said set of training data identified as an anomaly;

determining a root cause of behavior of said machine learning model that caused said at least one data point to be an anomaly, wherein determining said root cause comprises one or more of: (i) determining a class imbalance in said set of training data; (ii) identifying that said at least one data point is an adversarial data point; (iii) identifying that said at least one data point is a confused class data point; and (iv) identifying that said at least one data point corresponds to a low density region in said set of training data;

adjusting said set of training data, based on said root cause, by at least one of: (i) relabeling at least a portion of said training data and (ii) adding additional training data to said set of training data; and re-training said machine learning model based on the adjusted set of training data to remove the behavior caused by said at least one anomaly;

wherein the method is carried out by at least one computing device.

* * * * *